United States Patent [19]

Nakao

[11] 3,964,883

[45] June 22, 1976

[54] METHOD FOR FILTERING AND CLEANING A FILTER BAG

[75] Inventor: Yosinori Nakao, Nishinomiya, Japan

[73] Assignee: Nakao Filter Media Corporation, Nishinomiya, Japan

[22] Filed: June 11, 1973

[21] Appl. No.: 368,945

[30] Foreign Application Priority Data

Jan. 13, 1973  Japan.................................. 48-6847

[52] U.S. Cl. .................................... 55/96; 55/284; 55/304; 55/338; 55/341

[51] Int. Cl.² ........................................ B01D 45/18

[58] Field of Search ................. 55/96, 97, 272, 273, 55/282, 283, 284, 286, 287, 288, 291, 295, 300, 301, 304, 305, 338, 339, 340, 341, 361, 370, 378, 428, 431, 467, 473, 369

[56] References Cited

UNITED STATES PATENTS

| | | | |
|---|---|---|---|
| 530,553 | 12/1894 | Rourke | 55/341 X |
| 699,460 | 5/1902 | Draver | 55/287 |
| 940,076 | 11/1909 | Seaver | 55/337 X |
| 1,454,492 | 5/1923 | Stroud | 55/340 X |
| 1,784,339 | 12/1930 | Clasen et al. | 55/288 |
| 2,031,030 | 2/1936 | Brizard | 55/341 X |
| 2,494,981 | 1/1950 | Acheson | 55/338 X |
| 2,500,851 | 3/1950 | Miller | 55/287 |
| 3,212,237 | 10/1965 | Wright | 55/96 |
| 3,344,589 | 10/1967 | Smith | 55/294 |
| 3,411,929 | 11/1968 | Garrett | 106/307 |
| 3,491,518 | 1/1970 | Williams | 302/59 X |
| 3,618,302 | 11/1971 | Cornett | 15/327 X |
| 3,861,893 | 1/1975 | Smith et al. | 55/302 |

*Primary Examiner*—Bernard Nozick
*Attorney, Agent, or Firm*—Hall & Houghton

[57] ABSTRACT

In an air filter unit, after dust collected by the filter bag is shaken off and exhausted and before normal operation is effected, the air inside the filter chamber but outside the filter bag is fed into the filter bag or a separate dust collector, thereby preventing dust particles from being discharged into the atmosphere along with the clear filtered air during the initial stage of normal operation. Other advantages and details in the construction will be made clear.

3 Claims, 3 Drawing Figures

METHOD FOR FILTERING AND CLEANING A FILTER BAG

BACKGROUND OF THE INVENTION a. Field of the Invention

The present invention relates to an air filter unit using a filter bag and more particularly it relates to a method for preventing dust from being discharged into the atmosphere along with the clean filtered air after collected dust is shaken off and exhausted and before normal operation is effected.

b. Description of the Prior Art

Air filter units using filter bags are suitable for separation and collection of fine solid particles suspended in the air, such units being in general use. When such unit is industrially used in a factory for cleaning dust-rich exhaust gases, a large amount of dust is collected on the inner surface of the bag in a short time to the extent that continued operation would greatly decrease efficiency of collection. As a result, it is necessary to clean the filter bag at suitable intervals of time. Heretofore, the cleaning of the filter bag has been carried out by stopping the suction and exhaust operation and imparting vibrations to the filter bag to cause the collected dust to separate from the bag and fall down by gravity for exhaust. With such operation, however, dust, though small in amount, is discharged along with the clean filtered air during the initial stage of the next suction and exhaust operation (normal operation). This is because fine dust particles which have penetrated into the woven structure of the bag and between the fibers and hence lodged therein are driven out of the bag due to a shock and relaxation caused upon shaking. Since the amount of escape of dust is small, it was neglected and the escaping dust was not recovered in the past. But today when working enviroment and control of exhaust gases have become problems, it cannot be neglected. Therefore, even if such escaping dust is valueless, it is necessary to decrease the amount of escape of fine dust particles to zero particularly where they are harmful directly or indirectly to the human body. Particularly, since there is no suitable dust collector for smaller particle diameter other than this apparatus, it is necessary to prevent said dust from being discharged into the atmosphere while using this apparatus.

ABSTRACT OF THE DISCLOSURE

The present invention is characterized in that after dust deposited on a filter bag is shaken off and exhausted and before normal operation is effected, the filtered air discharge line is closed and the air inside the filter chamber but outside the filter bag is fed into the filter bag or a separate dust collector, whereby dust particles are prevented from being discharged into the atmosphere along with the clean filtered air during the initial stage of normal operation.

BRIEF DESCRIPTION OF THE DRAWINGS

In the accompanying drawings showing preferred embodiments of the invention.

DESCRIPTION OF THE PREFERRED EMBODIMENTS

Embodiment 1

Figure 1:
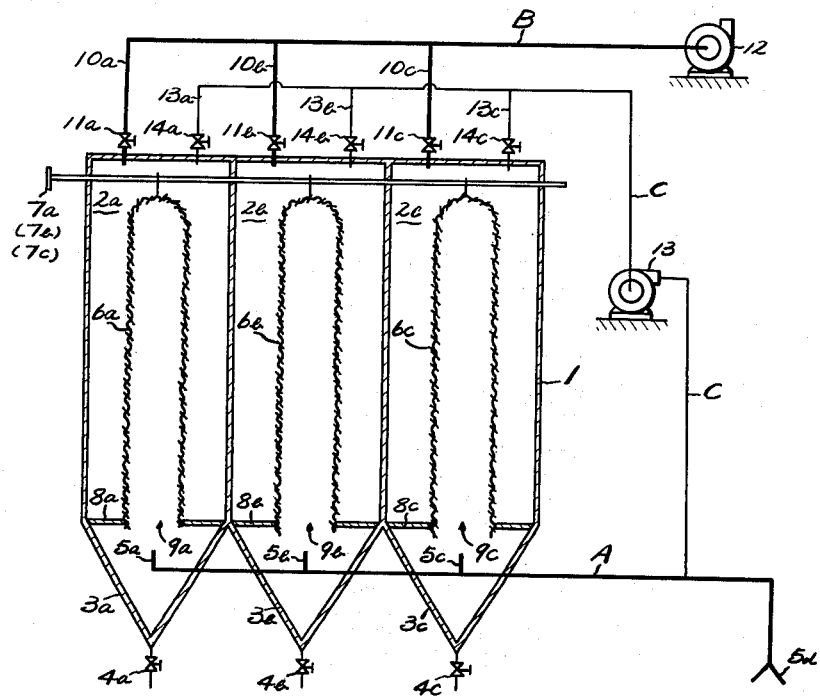
FIG. 1 is an explanatory view of a filter unit of the suction closed type illustrating a first embodiment of the present invention.

In FIG. 1, shown at 1 is a filter chamber assembly comprising three air-tight filter chambers 2a, 2b and 2c having dust chutes 3a, 3b and 3c, respectively, formed thereunder. Dust exhaust valves 4a, 4b and 4c are provided in the bottoms of the dust chutes.

A suction pipe A has its one end 5d positioned at and opening to a dust producing area and the other end thereof branching out into pipes 5a, 5b and 5d which open to and are positioned within the respective dust chutes.

Cylindrical filter bags 6a, 6b and 6c with their upper ends closed are suspended in the middle regions of the respective filter chambers by support members 7a, 7b and 7c in such a manner that they can be individually fluttered. The lower open ends of the filter bags are fitted around the peripheral edges of inlet openings 9a, 9b and 9c in the bottom plates 8a, 8b and 8c of the filter chambers. One end of an exhaust pipe B branches out into pipes 10a, 10b and 10c which are connected to the upper parts of the filter chambers through valves 11a, 11b and 11c. The other end of the exhaust pipe is connected to the inlet of a blower 12. One end of a return blow pipe C branches out into pipes 13a, 13b and 13c which are connected to the upper parts of the filter chambers through valves 14a, 14b and 14c. The other end of the return flow pipe is connected to the suction pipe A at an intermediate place thereon. Placed in the return flow pipe C at intermediate place thereon is a return flow blower 13 whose capacity is about one tenth of that of the blower 12.

During normal operation, the valves 11a, 11b and 11c are open while the dust exhaust valves 4a, 4b and 4c are closed, with the blown 12 driven. Dust-containing air from the dust producing area passes through the pipe A and is sucked into the filter bags 6a, 6b and 6c in the filter chambers 2a, 2b and 2c. The air then flows out through the filter bags while the dust is separated therefrom and collected on the inner surfaces of the filter bags. The clean air which comes out of the filter bags in the filter chambers flows through the pipes 10a, 10b and 10c and exhaust pipe B and is finally discharged from the blower 12. During such normal operation, the return flow blower 13 is preferably at a stop but it may be kept driven with the valves 14a, 14b 14c closed.

At this time of cleaning, the filter bags 6a, 6b and 6c in the filter chambers 2a, 2b and 2c may be cleaned either in unison or individually at suitable different intervals of time. In the case of cleaning in unison, exhaust from all the filter chambers is interrupted either by stopping the blower 12 or by closing the valves 11a, 11b and 11c. The support members 7a, 7b and 7c are then operated to flutter the bags to shake the collected dust off the inner bag-surfaces down into the dust chutes. The exhaust valves 4a, 4b and 4c are then opened to exhaust the shaken off dust to a predetermined place. In the case of individual cleaning, for example, the valve 11a of the filter chamber 6a is closed to interrupt exhaust from said chamber and the support member 7a for the filter bag 6a associatied with said chamber is operated to flutter the filter bag 6a to shake the collected dust off the inner bag-surface down into the chute 3a and the dust exhaust valve 4a to exhaust the fallen dust. All this while, the other dust chambers 2b and 2c with their valves 11b and 11c open are continuing normal operation by means of the blower 12.

After cleaning, the following circulatory cleaning operation is carried out before normal operation is effected.

After cleaning in unison, the now-opened dust exhaust valves 4a, 4b and 4c are closed and the valves 14a, 14b and 14c in the return flow pipe C are opened. The blower 13 in the return flow pipe C, if being kept driven, is kept intact, but if it is at a stop it is then driven. Thus the air in the chambers 2a, 2b and 2c flows through the return flow pipe C back into the suction pipe A at intermediate place thereon, wherefrom it is fed again into the filter bags 6a, 6b and 6c, thereby collecting the dust deposited on the outer surface of the filter bags. After the lapse of a required period of time, the valves 14a, 14b and 14c are closed and the valves 11a, 11b and 11c are opened, whereby said normal operation is resumed. In the case of individual cleaning, after the cleaning of the filter, for example, 6a, the now-opened dust exhaust valve 4a is closed and the valve 14a in the return flow pipe is opened to cause the air in the filter chamber 2a to flow through the return flow pipe C back into the suction pipe A at an intermediate place thereon, wherefrom it is fed again into the filter bag 6a, thereby collecting the dust. During this operation, the other filter chambers 6b and 6c are continuing normal operation by means of the blower 12. After the lapse of a required period of time, the valve 14a is closed and the valve 11a is opened to resume said normal operation.

Thus, according to this embodiment, after the dust in the filter bag or bags is shaken off and exhausted and before normal operation is effected, dust particles escaping from the filter bag or bags into the chamber or chambers are caused to flow back into said filter bag or bags for collection, whereby said dust particles are prevented from being discharged along with the filtered air. Further, the filter chambers can be successively cleaned at suitable different intervals of time. Thus, while one chamber is being cleaned, the other chambers may continue normal operation, so that as a whole the entire system may continuously effect normal operation. Further, all the chambers can be cleaned in unison. Also, regardless of whether normal operation or cleaning is being effected, with the blowers 12 and 13 continuously driven, it is possible to effect changeover between normal operation and circulatory cleaning operation by simply closing or opening the pertinent valves.

Embodiment II

Figure 2:
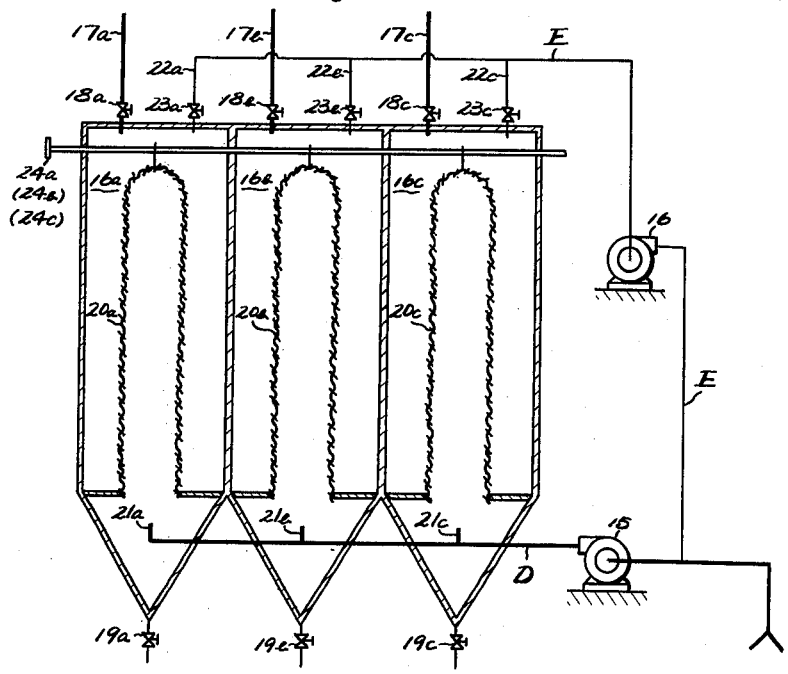
FIG. 2 is an explanatory view of a filter unit of the push-in closed type illustrating a second embodiment of the invention.

As shown in FIG. 2, a blower 15 is placed in a suction pipe D at intermediate place thereon. Filter chambers 16a, 16b and 16c have pipes 17a, 17b and 17c which are provided with valves 18a, 18b and 18c, respectively, the front ends of said valves opening to the atmosphere. During normal operation, the valves 18a, 18b and 18c are open and dust exhaust valves are closed, with the blower 15 driven. Dust-containing gases in a dust producing area is sucked through the suction pipe D and forced into the filter bags 20a, 20b and 20c of the filter chambers to allow the dust particles to separate from the air and collect on the inner surfaces of the filter bags, while the clean air passing through the filter bags is discharged into the atmosphere through the pipes 17a, 17b and 17c. During this normal operation, a blower 16 placed in a return flow pipe E may be at a stop or it may be kept driven with the valves 23a, 23b and 23c in the pipes 22a, 22b and 22c closed. At the time of cleaning, the filter bags in the filter chambers are cleaned in unison. Thus, the blower 15 is stopped, the valves 18a, 18b and 18c are closed and the support members 24a, 24b and 24c are operated to carry out shaking off in the same manner as in the preceding embodiment. The dust exhaust valves are then opened to exhaust the dust. Before normal operation, the next circulatory cleaning is started by closing the dust exhaust valves and opening the valves 23a, 23b and 23c, driving the blower 15. As for the blower 16, if it is being driven, it is kept intact, but if it is at a stop, it is driven. By these procedures, the gases in the filter chambers are caused to return and circulate through the return flow pipe E and suction pipe D, whereby cleaning operation is carried out in the same manner as deseribed above.

Thus it is seen that according to this embodiment, in the filter unit of the push-in closed type, after the dust on the filter bags have been shaken off and exhausted and before normal operation is effected, the dust particles escaping from the filter bags into the chambers are caused to return to the same filter bags for collection therein, whereby said dust particles are prevented from being discharged along with the filtered air during the initial stage of normal operation. Further, at the time of cleaning, it is necessary to interrupt the normal operation for all the chambers, but it is possible to allow the return flow blower to be continuously driven during said normal operation by closing the valves in the return flow line.

Embodiment III

In the preceding embodiments, the closed type is employed in which filter bags are individually received in different filter chambers, but the open type may be used.

Figure 3:
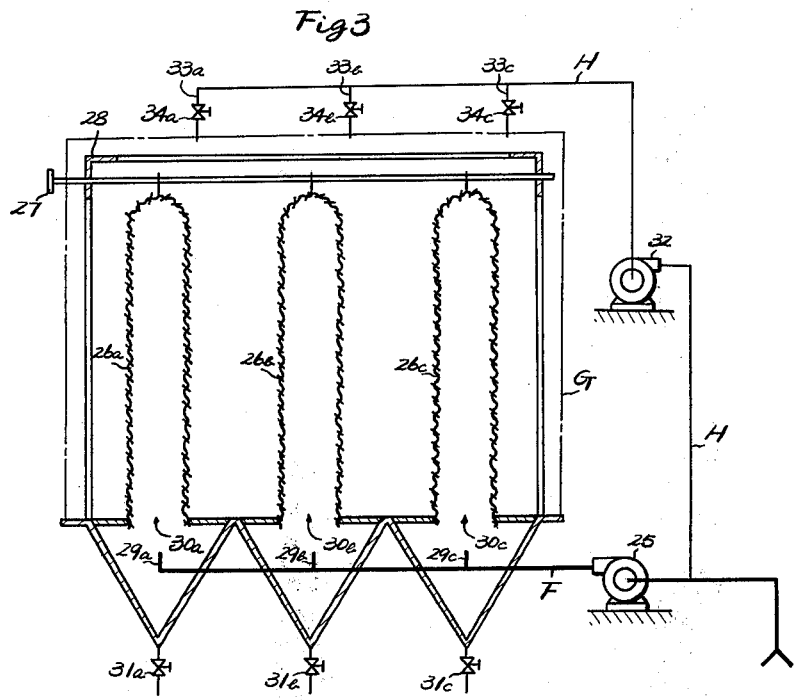
FIG. 3 is an explanatory view of the push-in open type illustrating a third embodiment of the invention.

FIG. 3 shows an embodiment of the open type. In this case, the open type is embodied in connection with the push-in type in which a blower 25 is placed in a suction line F at an intermediate place thereon, the filter bags 26a, 26b and 26c being in an open state. Therefore, their support member 27 is mounted in a frame member 28. During normal operation, the blower 25 is driven so that dust-containing gases from a dust producing area are sucked into the filter bags through the suction pipe F, pipes 29a, 29b and 29c and inlet openings 30a, 30b and 30c and filtration of air is effected. At the time of cleaning, the blower 25 is stopped and shaking off and exhaust of the dust is effected in the same manner as in the preceding embodiments. The dust exhaust valves 31a, 31b and 31c are closed and before normal operation is effected, a cover bag G is placed over the filter bags to air-tightly cover the same. A return flow blower 32 placed in a return flow pipe H which connects between the cover bag G and the suction pipe F is driven, valves 34a, 34b and 34c placed in pipes 33a, 33b and 33c are opened and the blower 25 is driven. Thereby, the gases in the cover bag G are caused to return and circulate to effect collection and cleaning in the same manner as in the preceding embodiments. Thereafter, the cover bag G is removed and normal operation is carried out.

Thus, it is seen that according to this embodiment, in the push-in open type filter unit, after the dust on the filter bags has been shaken off and exhausted and before normal operation is effected, the dust particles escaping from the filter bags are caused to return to the filter bags for collection, whereby said dust particles are prevented from being discharged along with the cleaned air during the initial stage of normal operation. Whiles there have been described herein what are at present considered preferred embodiments of the several features of the invention, it will be obvious to those skilled in the art that modifications and changes may be made without departing from the essence of the invention.

It is therefore to be understood that the examplary embodiments thereof are illustrative and not restrictive of the invention, the scope of which is defined in the appended claims and that all mofifications that come within the meaning and range of equivalency of the claims are intended to be included therein.

I claim:

1. A method of cleaning an air filter unit having at least one filtering chamber, at least one cylindrical filter bag vertically suspended within said chamber in an upright position with the open end of the filter bag facing down, air inlet means extending into the bottom of the filtering chamber and associated with the open end of said vertically suspended filter bag for passing dust laden air upwardly thereinto, first filtered air exhaust valve means connected to the top of said filtering chamber, second air exhaust valve means connected at one end to the top of said filtering chamber and at the other end to blower means connected to the air inlet means, and at least one dust collection zone positioned at the bottom of the filtering zone below the open end of the filter bag and comprising the following steps: passing dust laden air upwardly into the open end g the filter bag from the air inlet means of the filter chamber, passing the air filtered by the filter bag through the open first filtered air exhaust valve means, while the second air exhaust valve means are closed, stopping the flow of dust laden air into the air inlet means of the filtering chamber, stopping the flow of filtered air from the filtering chamber by closing the first filtered air exhaust valve means, mechanically shaking the filter bag to remove the collected dust from the interior surface of the filter bag to permit same to fall by gravity to the collection zone, removing the collected dust from the collection zone of the filtering chamber, opening the second air exhaust valve means connected to the top of said filter chamber, operating the blower means to withdraw air from within the filtering chamber and air that has previously passed through the filter bag through the second air exhaust valve means, passing the collected air to said blower means, blowing and circulating such collected and withdrawn air in the closed system into the air inlet means associated with the bottom open end of the filter bag to pass such clean air therethrough and to further clean the inside surface of the filter bag, continuing the passage of the collected and withdrawn air in a closed system for a predetermined time and until the filter bag has been cleaned to the extent desired thereby preventing dust from being discharged into the atmosphere along with the cleaned and filtered air after the initial cleaning and removal of collected dust has been completed, closing the second air exhaust valve means, opening the first filtered air valve exhaust means, and thereafter resuming the passage of the dust laden air into the air inlet means of the filtering chamber for filtering therein.

2. A method in accordance with claim 1, wherein the air filter units include a plurality of separate filtering chambers and a filter bag is suspended in each individual filtering chamber, and the dust laden air flow into each dust bag inlet means of each filter bag is stopped simultaneously and the cleaning air in the closed system is simultaneously passed back into the air inlet means of each filter bag.

3. A method in accordance with claim 1, wherein the air filter units include a plurality of separate filtering chambers and a filter bag is suspended in each individual filtering chamber, and the dust laden air flow passing into each dust bag inlet means of each filter bag is stopped individually and independent of all other dust bag inlet means and the cleaning air in the closed system is passed back individually into each air inlet means of said filter bag independent of all other dust bag inlet means.

* * * * *